US006409411B1

(12) United States Patent
Crorey

(10) Patent No.: US 6,409,411 B1
(45) Date of Patent: Jun. 25, 2002

(54) MODULAR TOOLING COUPLING APPARATUS

(75) Inventor: David J. Crorey, Clinton Township, MI (US)

(73) Assignee: Norgren Automotive, Inc., Mt. Clemens, MI (US)

( * ) Notice: Subject to any disclaimer, the term of this patent is extended or adjusted under 35 U.S.C. 154(b) by 0 days.

(21) Appl. No.: 09/458,519

(22) Filed: Dec. 13, 1999

(51) Int. Cl.[7] .................... E04G 3/00

(52) U.S. Cl. .................... 403/97; 403/84; 403/91; 403/54

(58) Field of Search .................... 403/97, 54, 84, 403/171, 91, 83, 98, 99, 101; 248/292.12

(56) References Cited

U.S. PATENT DOCUMENTS

| | | | | |
|---|---|---|---|---|
| 3,205,522 A | * 9/1965 | Then | 403/97 |
| 3,799,599 A | 3/1974 | Jordan | |
| 3,922,481 A | 11/1975 | Lewis | |
| 4,447,170 A | 5/1984 | Holmes | |
| 4,474,328 A | 10/1984 | Hale | |
| 4,547,092 A | 10/1985 | Vetter et al. | 403/59 |
| 4,875,651 A | 10/1989 | Wergin et al. | 248/286 |
| 4,986,016 A | 1/1991 | Wichman | |
| 5,520,474 A | 5/1996 | Liu | |
| 5,538,215 A | 7/1996 | Hosey | 248/286.1 |
| 5,547,305 A | * 8/1996 | Treche | 403/97 |
| 5,564,852 A | 10/1996 | Maxwell | |
| 6,079,682 A | * 6/2000 | Olkkola | 248/282.12 X |

* cited by examiner

*Primary Examiner*—Lynne H. Browne
*Assistant Examiner*—John R. Cottingham
(74) *Attorney, Agent, or Firm*—Young & Basile, P.C.

(57) ABSTRACT

A coupling apparatus for adjustably mounting modular tooling members having a base member releasably connectable to a slide mount wherein the base member is adjustably located along a predetermined linear path of travel defined by the slide mount. The base member is rotatably adjustable with respect to a midportion via a pair of matingly engaging contoured surfaces. The contoured surfaces are substantially circular having V-shaped teeth extending radially outward. The V-shaped teeth of the contoured surfaces matingly engage and are secured by fasteners to prevent any radial movement of the midportion with respect to the end member. The midportion may also be rotatably adjustable with respect to an end member along a second centerline axis. The midportion and the end member may be adjustably rotated through a pair of contoured surfaces substantially similar to that provided between the midportion and the base member. The end member provides an aperture for releasably connecting a boom rod to the end member.

38 Claims, 2 Drawing Sheets

54 34 30 22 26 43 62 47 24 42 46 36 55 64 26 44 40 22 52 38 32 24 53 57 12 16 49 70 48 50 68 60 51 18 72 58 20 66 56

MODULAR TOOLING COUPLING APPARATUS

FIELD OF THE INVENTION

The present invention relates to a coupling apparatus for adjustably mounting modular tooling members, and in particular, a coupling apparatus that provides multi-axial adjustment of modular tooling members through adjustable engagements of adjoining members of the coupling apparatus.

BACKGROUND OF THE INVENTION

With the advent of mechanical manipulators and robotic arms, various tooling assemblies and workpiece handling devices have been designed to quickly connect and disconnect to mechanical manipulators and robotic arms so that a variety of modular tooling assemblies can be utilized with the same manipulator. Flexibility and adjustability are preferably designed into the tooling assemblies so that the tooling assemblies can be configured for a variety of workpiece configurations. Previous tooling assemblies have utilized various sections of tubing interconnected by various brackets and mounts for fixturing a variety of workpieces, but such designs are typically rigid and provide little or no adjustment in the tooling assembly. Other designs have utilized extrusions or slide mounts to allow the sections of tubing to be adjusted along a linear path of travel, but such designs have a limited amount of adjustability in that they provide only one degree or axis of adjustment.

Other known designs have utilized ball mounts at the end of the tubes to provide rotational or orbital adjustment of the tubing. Such ball mounts typically provide a bracket that receives and clamps a spherical ball through the use of a conventional fastener. Due to the clamps, such ball mounts typically do not provide 360° rotational movement. In addition, these designs are susceptible to slipping, especially when such tooling mounts are exposed to various grease and oils, as well as random forces, that are common in an industrial environment. If the ball mount slips, the workpiece handling boom may become misaligned with respect to the workpiece thereby causing the work station to be shut down and readjusted. These shutdowns create inefficiencies that are undesirable in an industrial environment.

Thus, it is desirable to produce a coupling apparatus for adjustably mounting modular tooling members that provides multi-axial adjustment without the risk of slipping and misaligning.

SUMMARY OF THE INVENTION

The present invention provides a coupling apparatus for adjustably mounting modular tooling members. The coupling apparatus provides a base member releasably connectable to a slide mount wherein the base member is adjustably located along a predetermined path of travel. The base member provides a contoured surface that matingly engages a first contoured surface of a midportion of the coupling apparatus for rotatably adjusting the midportion with respect to the base member about a first axis. The midportion also provides a second contoured surface that matingly engages a contoured surface of an end member of the coupling apparatus. The end member is adjustably connected to the midportion for rotatably adjusting the end member about a second axis. The end member is releasably connectable to a tooling rod.

In the preferred embodiment, the base member, midportion, and end member are situated such that the first axis is substantially perpendicular to the second axis. The path of travel in which the base member moves along the slide mount is substantially linear and substantially perpendicular to the first axis.

Each of the contoured surfaces of the base member, midportion and end member are substantially similar in that they each provide a substantially circular surface having v-shaped teeth extending radially outward from the first and second axis.

BRIEF DESCRIPTION OF THE DRAWINGS

The various other uses of the present invention will become more apparent by referring to the following detailed descriptions and drawings in which.

DETAILED DESCRIPTION OF THE PREFERRED EMBODIMENT

Figure 1:
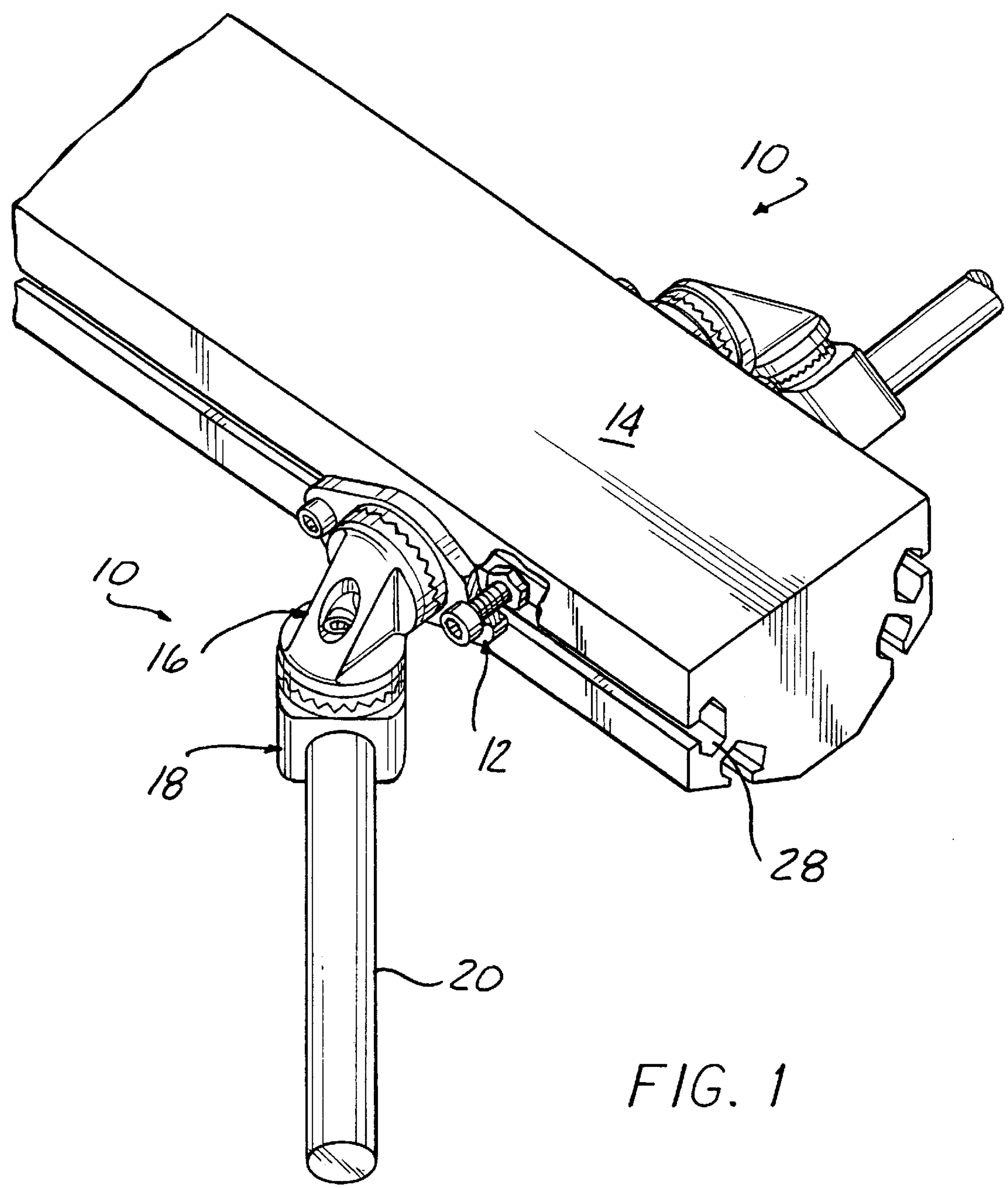
FIG. 1 is a perspective view showing the coupling apparatus attached to a slide mount.

FIG. 1 is a coupling apparatus 10 of the present invention. The coupling apparatus 10 has a base member 12 that is releasably connectable to a slide mount 14 for adjustably locating the coupling apparatus 10 along a predetermined path of travel. The base member 12 is adjustably connected to a midportion 16 of the coupling apparatus 10, and the midportion 16 is adjustably connected to an end member 18 of the coupling apparatus 10. All three members 12, 16, 18 of the coupling apparatus 10 are preferably fabricated from cast aluminum to create a light weight, strong part that does not require machining. The present invention is not limited to cast aluminum, but rather, the coupling apparatus 10 may be fabricated from any material having the strength necessary to support the tooling assemblies and workpieces utilized in conjunction with the coupling apparatus 10. The end member 18 is releasably connectable to a tooling rod or boom rod 20 that is typically utilized for carrying workpiece handling fixtures such as vacuum cups and/or clamps (not shown).

Figure 2:
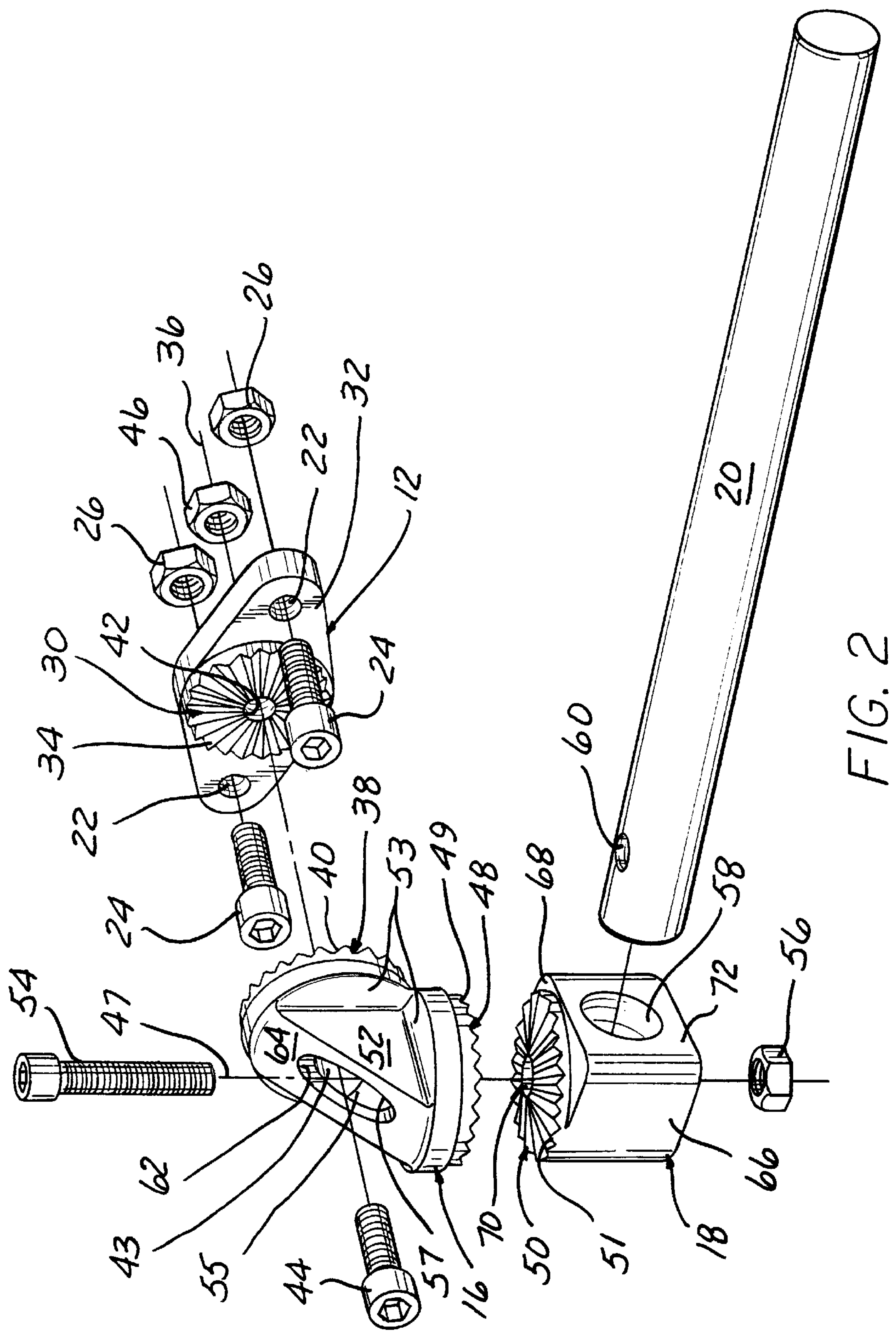
FIG. 2 is an exploded view showing the coupling apparatus of the present invention.

To adjustably locate the coupling apparatus 10 along the slide mount 14, the base member 12 has a substantially diamond shape configuration, as seen in FIGS. 1 and 2. An aperture 22 is provided at each end of the base member 12, and the apertures 22 receive threaded fasteners 24 that each threadingly engage a nut 26 on the opposite side of the base member 12. The nuts 26 are received and captured within a slot 28 provided in the slide mount 14. The slot 28 has a substantially C-shaped configuration so that the nuts 26 remain captured within the slot 28 while providing the fasteners 24 access to the nuts 26 through the opening in the C-shaped slot 28. The C-shaped slot 28 extends substantially linearly along a longitudinal axis.

To provide rotational adjustment of the midportion 16 with respect to the base member 12, the base member 12 provides a contoured surface 30 on the front side 32 of the base member 12. The contoured surface 30 is substantially circular and slightly raised from the front side 32 of the base member 12. The contoured surface 30 has V-shaped teeth 34 formed therein which extend radially outward from a first centerline axis 36 of the contoured surface 30. The V-shaped teeth 34 are circumferentially adjacent one another so as the V-shaped teeth 34 extend radially outward, the teeth 34 become wider to form a substantially concentric and uniform surface.

The midportion 16 provides a first contoured surface 38 that matingly engages the contoured surface 30 of the base member 12. The first contoured surface 38 of the midportion 16 is substantially similar to the contoured surface 30 of the base member 12 in that the first contoured surface 38 of the midportion 16 has a substantially circular surface having V-shaped teeth 40 extending radially outward from the first centerline axis 36. The contoured surfaces 30, 38 matingly engage by having the raised portions of the V-shaped teeth 34, 40 matingly engage valleys or lower portions of the V-shaped teeth 40, 34 of the opposing contoured surface 38, 30. Both the base member 12 and the midportion 16 provide apertures 42, 43, respectively, along the first centerline axis 36 for receiving a fastener 44 that extends through midportion 16 and base member 12 and is threadingly received by a threaded nut 46 that is captured within the slot 28 of the slide mount 14. The fastener 44 and the nut 46 connect and secure the midportion 16 to the base member by ensuring that the contoured surfaces 30, 38 maintain their engagement. This type of circular mating engagement without interference from neighboring parts allows for complete 360° orbital adjustment of the midportion 16 about the first centerline axis 36 relative to the base member 12.

In order to provide a second degree of rotational adjustment of the coupling apparatus 10, the midportion 16 is also rotatably adjustable about a second centerline axis 47 with respect to the end member 18 by having a second contoured surface 48 of the midportion 16 matingly engage a contoured surface 50 of the end member 18. The contoured surfaces 48, 50 of the midportion 16 and the end member 18, respectively, are substantially similar to the contoured surfaces 30, 38 provided between the base member 12 and the midportion 16, respectively, in that the contoured surfaces 48, 50 both provide substantially V-shaped teeth 49, 51 that extend radially outward from the second centerline axis 47. As similarly stated with regard to the base member 12 and the midportion 16, this type of circular mating engagement without interference from neighboring parts allows for complete 360° orbital adjustment of the midportion 16 about the second centerline axis 47 with respect to the end member 18.

The first contoured surface 38 and the second contoured surface 48 of the midportion 16 are integrally formed at one end of the contoured surfaces 38, 48 and offset from one another at a substantially 90° angle. The backsides 53 of the contoured surfaces 38, 48 are connected and supported by a substantially triangular webbing or structural support 52 that is integral with and extends between the backsides 53 of the contoured surfaces 38, 48. The structural support 52 has an aperture or cavity 55 which extends along the first centerline axis 36 and the second centerline axis 47. In addition, the aperture or cavity 55 is in communication with the aperture 43 in the first contoured surface 38 of the midportion 16 and an aperture 57 in the second contoured surface 48 of the midportion 16. The aperture 55 extends outward from the structural support 52 at the intersection of the first and second centerline axes 36, 47 to form a substantially oval shaped opening 62 on an outer surface 64 of the structural support 52. The substantially oval shaped opening 62 in the structural support 52 provides access to fasteners 44, 54 along the first and second centerline axes 36, 47, respectively, and allows for the heads of the fasteners 44, 54 to be housed within the cavity 55 of the structural support. A threaded nut 56 threadingly receives the fastener 54 and connects and secures the midportion 16 to the end member 18 by maintaining engagement between the contoured surfaces 48, 50 of the midportion 16 and the end member 18.

To releasably connect the boom rod 20 to the end member 18, the end member 18 has a substantially square body 66 having rounded corners with one of its sides being substantially arcuate. A top surface 68 of the end member 18 has the contoured surface 50 formed therein with an aperture 70 extending through the end member 18 along the second centerline axis 47. A second aperture 58, substantially perpendicular to said second centerline axis 47, is formed through a sidewall 72 of the end member 18 and is designed to receive an end of the boom rod 20. The boom rod 20 has an aperture 60 extending therethrough for receiving the fastener 54 that releasably connects the midportion 16 to the end member 18. The aperture 60 in the boom rod 20 receives the fastener 54 by having the centerline axis of the aperture 60 correspondingly align with the second centerline axis 47.

In use, the coupling apparatus 10 may be adjusted along several axes of movement. The entire coupling apparatus 10 may be adjusted along the linear path of travel of the slide mount 14 by loosening the fasteners 24, 44 from the nuts 26, 46, respectively. The coupling apparatus 10 is moved along the slot 28 of the slide mount 14 until the proper location is determined. The fasteners 24, 44 are then threaded into their respective nuts 26, 46 until the coupling apparatus 10 is secured to the slide mount 14.

The midportion 16 may be rotatably adjusted with respect to the base member 12 along the first centerline axis 36 by loosening the fastener 44 from the nut 46. The fastener 44 must be loosened far enough to allow the opposing V-shaped teeth 34, 40 of the contoured surfaces 30, 38, respectively, to rotate with respect to one another. Once the desired position of the midportion 16 is determined with respect to the base member 12, the fastener 44 is threaded into the nut 46 until the midportion 16 is secured to the base member 12 and rotational movement of the midportion 16 with respect to the base member 12 is prohibited by maintaining engagement between the V-shaped teeth 34, 40 of the contoured surfaces 30, 38.

To rotatably adjust the end member 18 with respect to the midportion 16 about the second centerline axis 47, the fastener 54 is loosened from the nut 56 until the V-shaped teeth 49, 51 of the contoured surfaces 48, 50 may rotate with respect to one another without engaging peaks of the opposing V-shaped teeth 49, 51. Once the desired rotational position of the end member 18 with respect to the midportion 16 is determined, the fastener 54 is threaded into the associated nut 56 until the end member 18 is secured to the midportion 16 and rotational movement of the midportion 16 and the end member 18 with respect to one another is prohibited by maintaining engagement between the V-shaped teeth 49, 51 of the contoured surfaces 48, 50.

To remove or change the boom rod 20, the fastener 54 is unthreaded from the corresponding nut 56 and removed from the aperture 60 provided in the boom rod 20. The boom rod 20 may then be removed and/or replaced with a different boom rod (not shown) wherein the fastener 54 would be reinserted through a similar corresponding aperture provided in the replacement boom rod. The fastener 54 would be threaded into the associated nut 56 until the boom rod was secure in the end member 18, and the end member 18 was secured to the midportion 16.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A coupling apparatus for adjustably mounting modular tooling members comprising:

a base member releasably connectable to a slide mount wherein said base member is adjustably located along a predetermined path of travel and said base member having a first contoured surface;

a midportion having second and third contoured surfaces wherein said second contoured surface matingly engages and is adjustably connected to said first contoured surface of said base member for rotatably adjusting said midportion about a first axis;

an end member releasably connectable to a tooling rod, and said end member having a fourth contoured surface wherein said third contoured surface of said midportion matingly engages and is adjustably connected to said fourth contoured surface of said end member for rotatably adjusting said end member about a second axis; and said base member, said midportion, and said end member fabricated from cast aluminum.

2. The coupling apparatus of claim 1, further comprising:

said first axis substantially perpendicular to said second axis.

3. The coupling apparatus of claim 1, further comprising:

said contoured surfaces having substantially v-shaped teeth formed therein.

4. The coupling apparatus of claim 3, further comprising:

said contoured surfaces being substantially circular and having said v-shaped teeth extending radially outward.

5. The coupling apparatus of claim 1, further comprising:

said path of travel being substantially linear.

6. The coupling apparatus of claim 5, further comprising:

said linear path of travel being substantially perpendicular to said first axis.

7. A coupling apparatus for adjustably mounting modular tooling members comprising:

a base member releasably connectable to a slide mount wherein said base member is adjustably located along a predetermined linear path of travel, and said base member having a first contoured surface;

a midportion having second and third contoured surfaces wherein said second contoured surface matingly engages and is adjustably connected to said first contoured surface of said base member for rotatably adjusting said midportion about a first axis;

an end member releasably connectable to a tooling rod, and said end member having a fourth contoured surface wherein said third contoured surface of said midportion matingly engages and is adjustably connected to said fourth contoured surface of said end member for rotatably adjusting said end member about a second axis wherein said first axis is substantially perpendicular to said second axis; and the base member, the midportion, and the end member fabricated from cast aluminum.

8. The coupling apparatus of claim 7, further comprising:

said base member having at least one aperture extending therethrough for receiving a fastener, and said fastener releasably engaging a slot of said slide mount to provide linear adjustment of said apparatus along said path of travel.

9. The coupling apparatus of claim 7, further comprising:

said contoured surfaces having substantially v-shaped teeth formed therein.

10. The coupling apparatus of claim 9, further comprising:

said contoured surfaces being substantially circular and having v-shaped teeth extending radially outward.

11. The coupling apparatus of claim 7, further comprising:

said linear path of travel being substantially perpendicular to said first axis.

12. The coupling apparatus of claim 7, further comprising:

said end member having an aperture adapted to receive said tooling rod wherein a fastener extends through said midportion, said end member and said tooling rod for securing said midportion to said end member and securing said tooling rod to said end member.

13. The coupling apparatus of claim 7, further comprising:

said midportion having a structural support extending between said second and third contoured surfaces, and said structural support having an aperture extending along said first axis and said second axis for receiving fasteners that releasably engage said midportion to said base member and said midportion to said end member.

14. The coupling apparatus of claim 7, further comprising:

said midportion being rotatably adjustable 360° with respect to said base member and said end member.

15. A coupling apparatus for adjustably mounting modular tooling members comprising:

a substantially diamond shaped base member having a first contoured surface formed thereon, and said base member releasably connectable to a slide mount wherein said base member is adjustably located along a predetermined linear path of travel;

a midportion having second and third contoured surfaces with a structural support extending between said second and third contoured surfaces, and said second contoured surface matingly engaging and adjustably connected to said first contoured surface of said base member for rotatably adjusting said midportion 360° about a first axis with respect to said base member; and an end member releasably connectable to a tooling rod and having a fourth contoured surface that matingly engages and is adjustably connected to said third contoured surface of said midportion for rotatably adjusting said end member 360° about a second axis with respect to said midportion wherein said first axis is substantially perpendicular to said second axis.

16. The coupling apparatus of claim 15, further comprising:

said base member having at least one aperture extending therethrough for receiving a fastener that is releasably connectable to a slot of said slide mount for providing linear adjustment of base member along said linear path of travel wherein said linear path of travel is perpendicular to said first axis.

17. The coupling apparatus of claim 15, further comprising:

said contoured surfaces having substantially v-shaped teeth formed therein.

18. The coupling apparatus of claim 17, further comprising:

said contoured surfaces being substantially circular and having said v-shaped teeth extending radially outward.

19. The coupling apparatus of claim 15, further comprising:

said structural support of said midportion having an aperture extending along said first and second axis for receiving fasteners that releasably engage said midportion to said base member and said midportion to said end member.

20. The coupling apparatus of claim 15, further comprising:

said end member having an aperture adapted to receive said tooling rod wherein a fastener extends through said midportion, said end member and said tooling rod for releasably connecting said end member to said tooling rod and said midportion.

21. A coupling apparatus for adjustably mounting modular tooling members comprising:

a substantially diamond shaped base member having a first contoured surface formed thereon, and said base member releasably connectable to a slide mount wherein said base member is adjustably located along a predetermined linear path of travel;

a midportion having second and third contoured surfaces with a structural support extending between said second and third contoured surfaces, and second contoured surface matingly engaging and adjustably connected to said first contoured surface of said base member for rotatably adjusting said midportion 360° about a first axis with respect to said base member;

an end member releasably connectable to a tooling rod and having a fourth contoured surface that matingly engages and is adjustably connected to said third contoured surface of said midportion for rotatably adjusting said end member 360° about a second axis with respect to said midportion wherein said first axis is substantially perpendicular to said second axis; and said base member, said midportion, and said end member fabricated from cast aluminum.

22. In a coupling apparatus for adjustably mounting modular tooling members on an elongate support boom having a mounting slot formed therein, the improvement comprising:

a non-cylindrical base member releasably and adjustably connectable along the mounting slot of the support boom, and the base member having a first contoured surface;

a midportion having second and third contoured surfaces, the second contoured surface matingly engagable and adjustably connectable to the first contoured surface of the base member for rotatably adjusting the midportion about a first axis; and an end member releasably connectable to a tooling support, the end member having a fourth contoured surface matingly engagable and adjustably connectable with the third contoured surface of the midportion for rotatably adjusting the end member about a second axis.

23. In a coupling apparatus for adjustably mounting modular tooling members on an elongate support boom having a mounting slot formed therein, the improvement comprising:

a base member releasably and adjustably connectable along the mounting slot of the support boom, and the base member having a first contoured surface;

a midportion having second and third contoured surfaces, the second contoured surface matingly engagable and adjustably connectable to the first contoured surface of the base member for rotatably adjusting the midportion about a first axis; and an end member releasably connectable to a tooling support, the end member having a fourth contoured surface matingly engagable and adjustably connectable with the third contoured surface of the midportion for rotatably adjusting the end member about a second axis, wherein the base member, the midportion, and the end member fabricated from cast aluminum.

24. The coupling apparatus of claim 22 further comprising:

the first axis lying in a common plane with the second axis.

25. The coupling apparatus of claim 22 further comprising:

the first axis intersecting the second axis.

26. In a coupling apparatus for adjustably mounting modular tooling members on an elongate support boom having a mounting slot formed therein, the improvement comprising:

a base member releasably and adjustably connectable along the mounting slot of the support boom, and the base member having a first contoured surface;

a midportion having second and third contour surfaces, the second contoured surface matingly engagable and adjustably connectable to the first contoured surface of the base member for rotatably adjusting the midportion about a first axis; and an end member releasably connectable to a tooling support, the end member having a fourth contoured surface matingly engagable and adjustably connectable with the third contoured surface of the midportion for rotatably adjusting the end member about a second axis, wherein the midportion having a central pocket defining at least one cavity for at least partially enclosing heads of fasteners housed within the cavity, the fasteners extending along the first axis and the second axis through the second and third contoured surfaces.

27. The coupling apparatus of claim 22 further comprising:

a tooling rod connectable to the end member with a fastener associated with the end member.

28. A coupling apparatus for adjustably mounting modular tooling members comprising:

a base member releasably and adjustably connectable along a mounting slot of a support boom, and the base member having a first contoured surface;

a midportion having second and third contoured surfaces, the second contoured surface matingly engagable and adjustably connectable to the first contoured surface of the base member for rotatably adjusting the midportion about a first axis; and an end member releasably connectable to a tooling rod, the end member having a fourth contoured surface matingly engagable and adjustably connectable to the third contoured surface of the midportion for rotatably adjusting the end member about a second axis, the second axis lying in a common plane with the first axis and intersecting the first axis at a predetermined angle.

29. A coupling apparatus for adjustably mounting modular tooling members comprising:

a base member releasably and adjustably connectable along a mounting slot of a support boom, and the base member having a first contoured surface;

a midportion having second and third contoured surfaces, the second contoured surface matingly engagable and adjustably connectable to the first contoured surface of the base member for rotatably adjusting the midportion about a first axis; and an end member releasably connectable to a tooling rod, the end member having a fourth contoured surface matingly engagable and adjustably connectable to the third contoured surface of the midportion for rotatably adjusting the end member about a second axis, the second axis lying in a common plane with the first axis and intersecting the first axis at a predetermined angle, wherein the base member, the midportion, and the end member fabricated from cast aluminum.

30. The coupling apparatus of claim 28 further comprising:

an elongate support boom having a mounting slot formed therein, the base member releasably and adjustably connectable along the mounting slot of the support boom.

31. The coupling apparatus of claim 28 further comprising:

the second axis intersecting the first axis at a perpendicular angle.

32. A coupling apparatus for adjustably mounting modular tooling members comprising:

a base member releasably and adjustably connectable along a mounting slot of a support boom, and the base member having a first contoured surface;

a midportion having second and third contoured surfaces, the second contoured surface matingly engagable and adjustably connectable to the first contoured surface of the base member for rotatably adjusting the midportion about a first axis; and an end member releasably connectable to a tooling rod, the end member having a fourth contoured surface matingly engagable and adjustably connectable to the third contoured surface of the midportion for rotatably adjusting the end member about a second axis, the second axis lying in a common plane with the first axis and intersecting the fast axis at a predetermined angle, wherein the midportion having a central pocket defining at least one cavity for at least partially enclosing heads of fasteners housed within the cavity, the fasteners extending along the first axis and the second axis through the second and third contoured surfaces.

33. The coupling apparatus of claim 28 further comprising:

a tooling rod connectable to the end member with a fastener associated with the end member.

34. A coupling apparatus for adjustably mounting modular tooling members comprising:

an elongate support boom having a mounting slot formed therein;

a substantially diamond shaped base member releasably and adjustably connectable to the mounting slot of the support boom, and the base member having a first contoured surface formed thereon;

a midportion having second and third contoured surfaces, the midportion having a central pocket defining at least one cavity for at least partially enclosing heads of fasteners housed within the cavity, the second contoured surface matingly engagable and adjustably connectable to the first contoured surface of the base member for rotatably adjusting the midportion 360° about a first axis with respect to the base member; and an end member releasably connectable to a tooling rod and having a fourth contoured surface matingly engagable and adjustably connectable to the third contoured surface of the midportion for rotatably adjusting the end member 360° about a second axis with respect to the midportion, wherein the first axis is substantially perpendicular to the second axis.

35. The coupling apparatus of claim 34 further comprising:

the first axis lying in a common plane with the second axis.

36. The coupling apparatus of claim 34 further comprising:

the first axis intersecting the second axis.

37. The coupling apparatus of claim 34 further comprising:

the fasteners extending along the first axis and the second axis through the second and third contoured surfaces.

38. The coupling apparatus of claim 34 further comprising:

a tooling rod connectable to the end member with a fastener associated with the end member.

* * * * *